UNITED STATES PATENT OFFICE.

EMIL SCHEITLIN, OF BASEL, SWITZERLAND.

PROCESS FOR PRODUCING A NEW EFFECTIVE PREPARATION OF MERCURY.

1,068,172.  Specification of Letters Patent.  Patented July 22, 1913.

No Drawing.  Application filed December 9, 1912. Serial No. 735,766.

*To all whom it may concern:*

Be it known that I, EMIL SCHEITLIN, a citizen of the Swiss Confederation, and residing at Basel, Switzerland, have invented certain new and useful Improvements in Processes for Producing a New Effective Preparation of Mercury, of which the following is a specification.

My invention relates to a process of manufacturing a new preparation of mercury.

I have found: If 1-phenyl-2.3-dimethyl-4-sulfamino-5-pyrazolone is allowed to act on mercuric oxid a new compound is obtained containing organic matter, sulfur and mercury. The percentage of mercury amounts to 41%.

The following formulæ may come into consideration:—

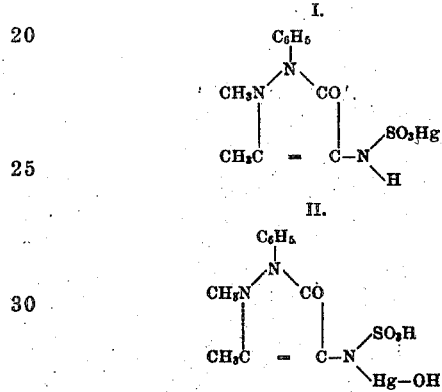

Formula II is very probably correct. According to formula I the mercuric oxid would first have to be reduced at the cost of a part of the organic matter.

When impure materials are employed or when reducing agents are added, products are also actually obtained which have a considerably higher percentage of mercury, and in which the SO$_3$H group is partially or wholly saturated by mercury.

The present process differs fundamentally from the process described in the *Chem. Centralblatt* 1908 II, page 1037/38, and from the products described there.

The body obtained is white, crystalline and fairly insensitive to light. It is soluble with difficulty in water and other solvents, and as good as insoluble after being dried. It dissolves fairly readily in concentrated sulfuric acid and apparently without decomposing, but when heated it decomposes, carbon being separated.

If the body is treated with dilute aqueous alkalis, a part of the mercury is precipitated as protoxid, while a body containing 24% mercury is dissolved.

Assuming that, when the SO$_3$H group is unsaturated by soda, 2 molecules unite, water being separated and half the mercury being separated as protoxid, theory requires 24% Hg for such a body which is confirmed by analysis. The mercury of this body can be precipitated by ammonium sulfid or by sulfureted hydrogen.

Example: 300 g. pure 1-phenyl-2.3-dimethyl-4-sulfamino-5-pyrazolone dissolved in abt. 10 liters water are added to mercuric oxid dissolved by alkali out of 270 g. sublimate. This is heated on the water bath until the yellow color of the mercuric oxid has disappeared and also the same has for the most part dissolved. The solution is then sucked away hot from the undissolved matter and rapidly cooled; the crystalline precipitate is separated from the mother lye, the product washed well and dried at abt. 60° C.

It has been found that the body, while very slightly poisonous, possesses an excellent spirillicide action, and that the medicinal dose and toxic dose are very different. The body is therefore excellently adapted for treating syphillis.

I claim:—

1. A process of producing a new preparation of mercury, which comprises causing mercuric oxid and 1-phenyl-2.3-dimethyl-4-sulfamino-5-pyrazolone to act on one another.

2. A 1-phenyl-2.3-dimethyl-4-sulfamino-5-pyrazolone mercury compound, which is a white crystalline poisonous substance soluble in water with difficulty, readily soluble in concentrated sulfuric acid, is decomposed by heat with liberation of carbon and from which the mercury can be precipitated by ammonium sulfid and sulfureted hydrogen.

In testimony whereof I affix my signature in presence of two witnesses.

EMIL SCHEITLIN.

Witnesses:
GEO. GIFFORD,
ARNOLD ZUBER.